April 10, 1962 J. N. BUTZ 3,028,953
PACKING FOR AUTOMOTIVE WINDSHIELDS OR THE LIKE
Filed May 16, 1961 4 Sheets-Sheet 1
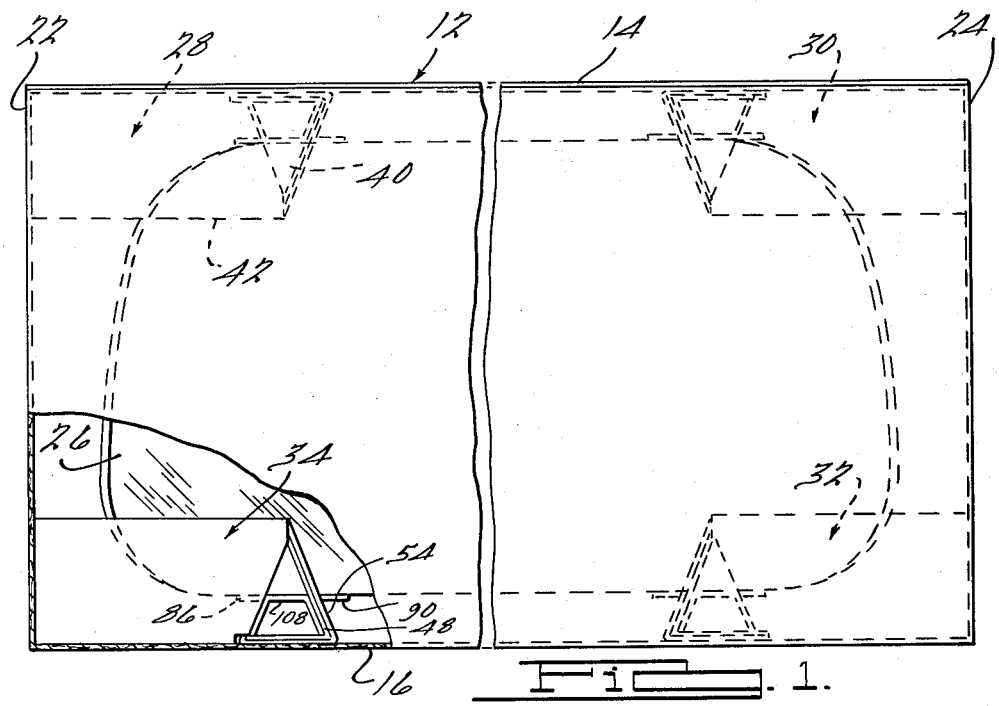
Fig. 1.
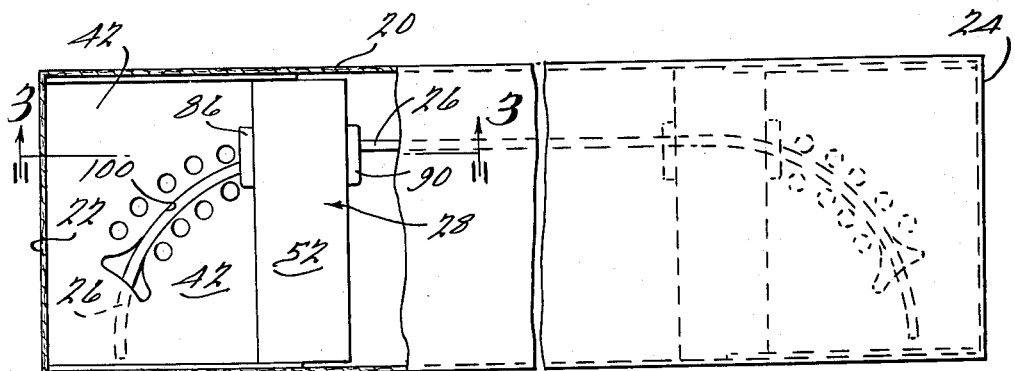
Fig. 2.
Fig. 3.
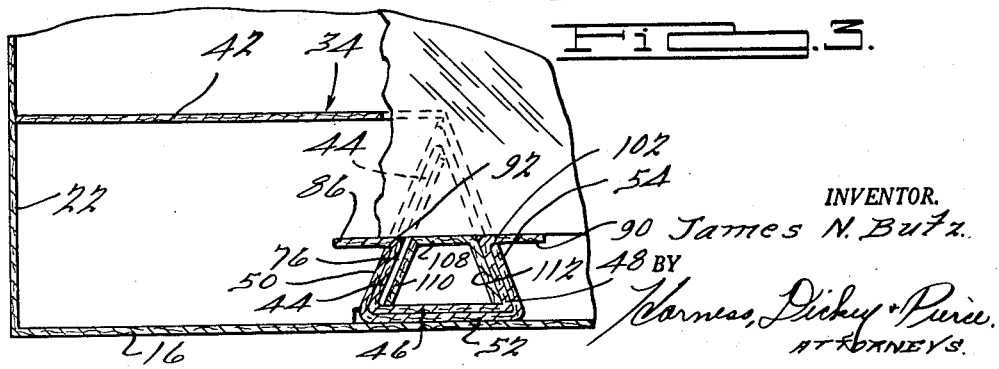
INVENTOR.
James N. Butz
BY
Harness, Dickey & Pierce
ATTORNEYS April 10, 1962 J. N. BUTZ 3,028,953
PACKING FOR AUTOMOTIVE WINDSHIELDS OR THE LIKE
Filed May 16, 1961 4 Sheets-Sheet 2
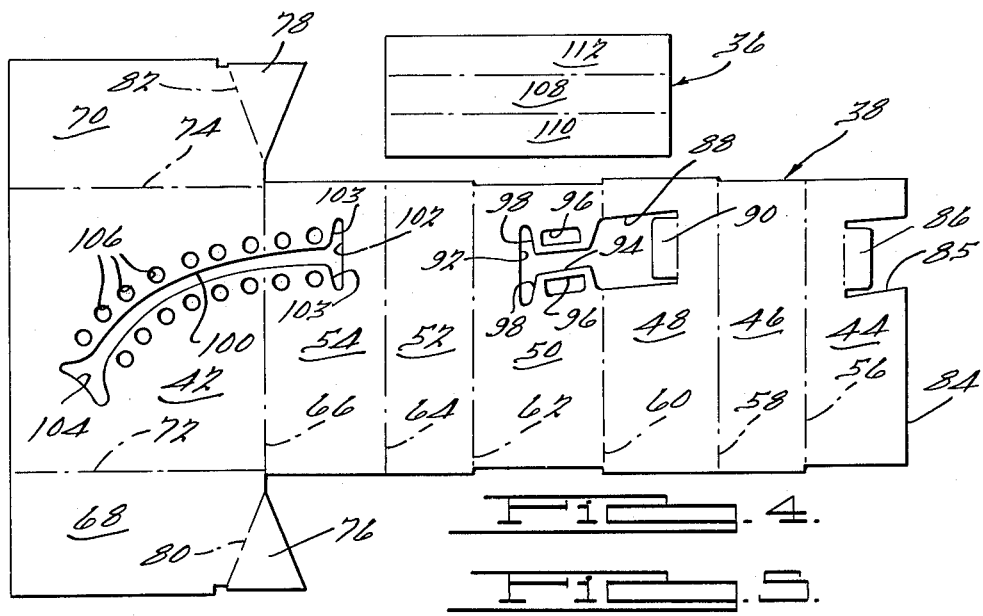
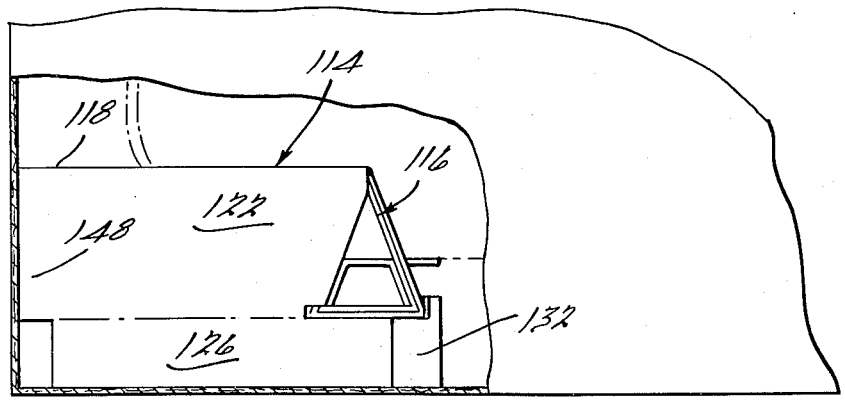
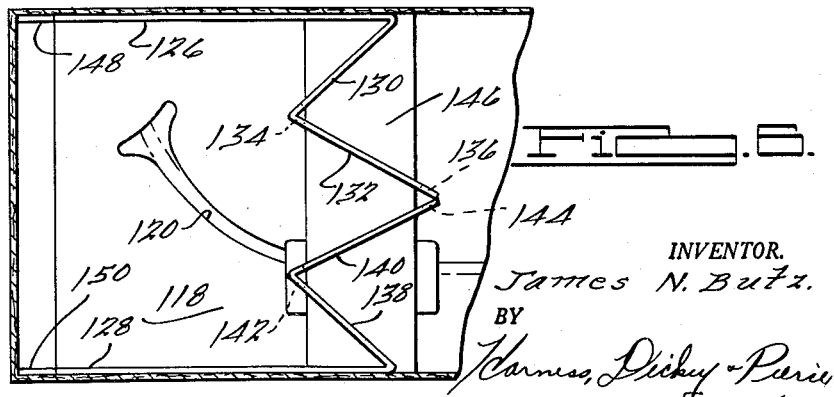
INVENTOR.
James N. Butz
BY
Harness, Dickey & Pierce
ATTORNEYS

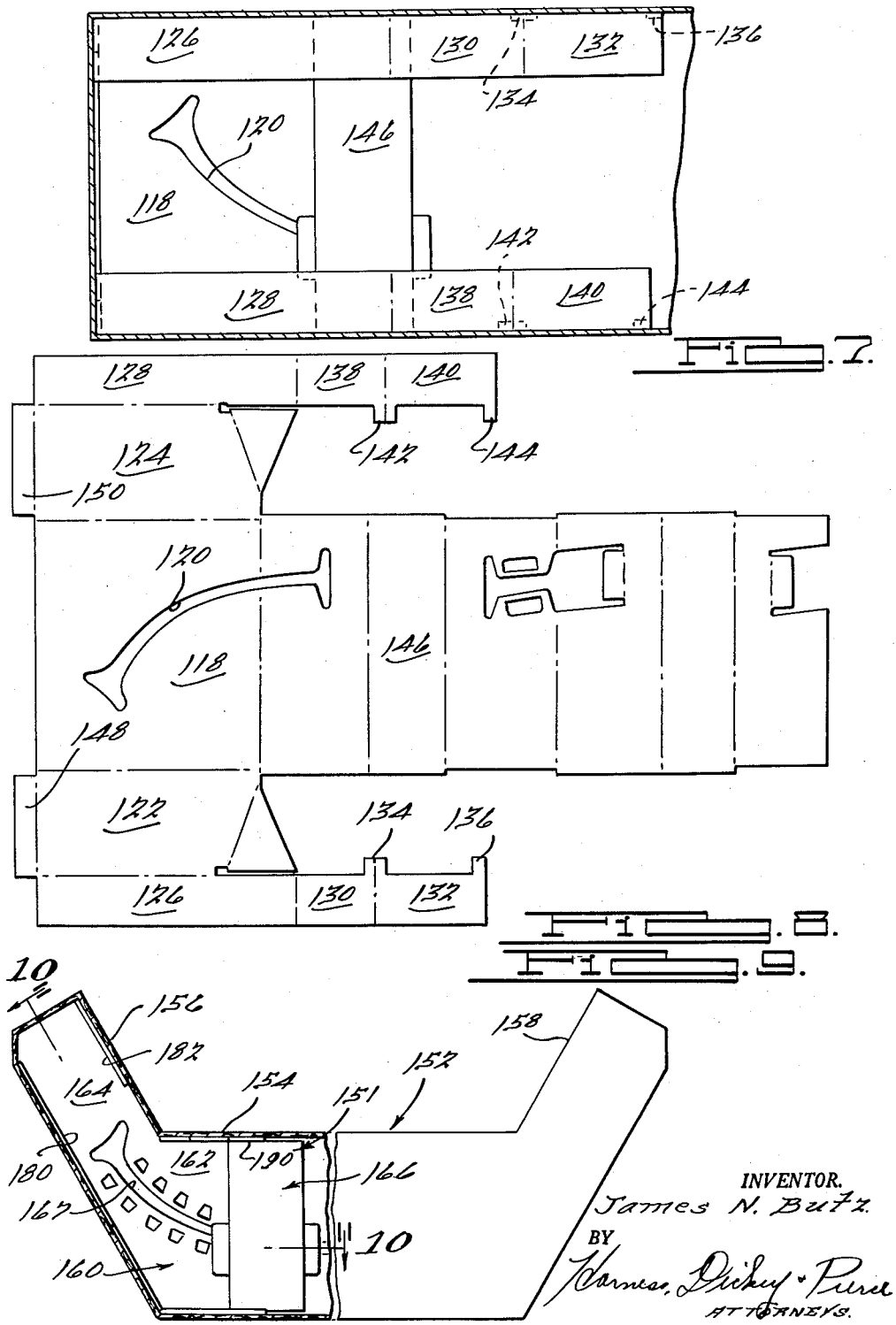

April 10, 1962                J. N. BUTZ                3,028,953
              PACKING FOR AUTOMOTIVE WINDSHIELDS OR THE LIKE
Filed May 16, 1961                                4 Sheets-Sheet 4

INVENTOR.
James N. Butz.
BY
Harness, Dickey & Pierce
ATTORNEYS.

United States Patent Office 3,028,953
Patented Apr. 10, 1962

3,028,953
PACKING FOR AUTOMOTIVE WINDSHIELDS
OR THE LIKE
James N. Butz, Royal Oak, Mich., assignor to Carroll Container Corporation, Detroit, Mich., a corporation of Michigan
Filed May 16, 1961, Ser. No. 110,476
7 Claims. (Cl. 206—62)

This invention relates to packing for sheets of frangible material, such as automotive windshields or the like.

It is an object of the present invention to provide a package for a windshield or the like including a shipping container and interior packing elements adapted to support the windshield within the shipping container in spaced relation to the walls of the container and in a manner which cushions the windshield against damage from shock, vibration and impact.

It is another object of the present invention to provide packing elements of the above character which may be inexpensively manufactured from corrugated paperboard or the like, which are readily assembled, which comprise relatively few separate pieces of material and which may be conveniently installed together with the windshield into the shipping container.

It is another object of the present invention to provide packing elements of the above character which are held in their intended position by the windshield without tipping or accidental dislocation.

It is a still further object of the present invention to provide packing elements of the above character which are adapted to support a heavy sheet of glass or the like over a limited surface area at the edge of the glass without excessive crushing and without the glass becoming embedded in the material of the packing element.

It is still another object of the present invention to provide a packing element of the above character which may be folded to accommodate shipping containers or windshields of varying sizes.

These and other objects of the present invention will become apparent from the following detailed description taken in conjunction with the accompanying drawings wherein:

FIGURE 1 is a front elevational view, with parts broken away, of a shipping container for a curved automotive windshield having interior packing elements embodying the features of the present invention;

FIG. 2 is a top plan view, with parts broken away, of the structure illustrated in FIGURE 1;

FIG. 3 is an enlarged fragmentary sectional view of the structure illustrated in FIGURE 1, taken along the line 3—3 thereof;

FIG. 4 is a plan view of the cut and scored sheets of material from which the packing elements shown in FIGS. 1 and 2 are formed;

FIG. 5 is a front elevational view of a packing element embodying another form of the invention, the packing element being shown in association with a fragmentarily illustrated shipping container and windshield;

FIG. 6 is a bottom plan view, with parts removed, of the structure shown in FIG. 5;

FIG. 7 is a view similar to FIG. 6 with parts of the packing element folded to an alternative position;

FIG. 8 is a reduced scale plan view of the cut and scored sheet of material from which the principal component of the packing element illustrated in FIGS. 5–7 is formed;

FIG. 9 is a bottom plan view, with parts broken away, of a shipping container for a curved windshield showing still another form of packing element embodying the principles of the present invention;

Figure 10:
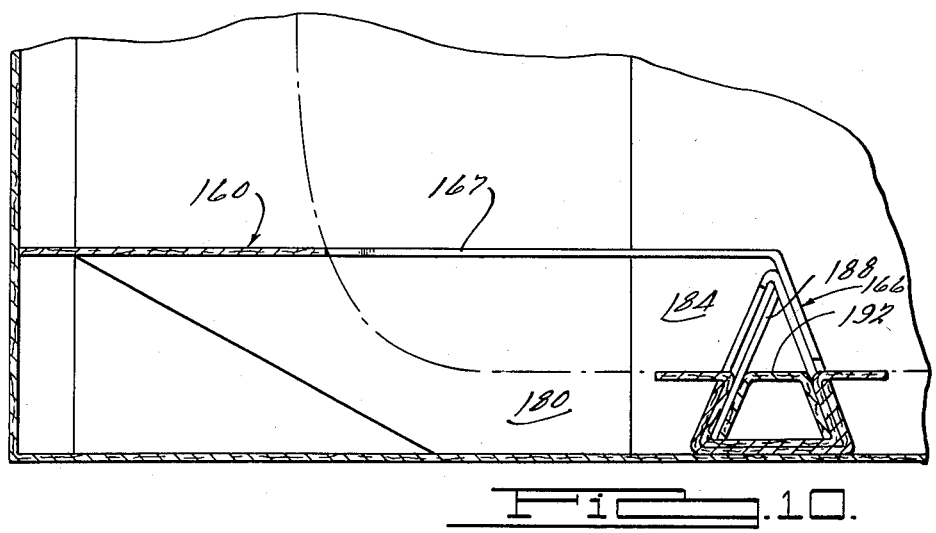
FIG. 10 is an enlarged sectional view of the structure illustrated in FIG. 9, taken along the line 10—10 thereof.

Referring now to the drawings, FIGS. 1 and 2 disclose a standard corrugated paperboard shipping carton 12 having a top wall 14, bottom wall 16, a front wall 18, a rear wall 20 and end walls 22 and 24. A curved windshield 26 is illustrated as being supported within the container 12 in spaced relation to all the walls of the container. Serving to support the windshield 26 are four interior packing elements 28, 30, 32 and 34, disposed at the upper left, upper right, lower right and lower left corners of the container, respectively. The container 12 is desirably made from corrugated paperboard or the like, although a variety of other materials may also be used. The interior packing elements are each formed from two cut, scored and folded sheets of material, as, for example, corrugated paperboard. Each packing element is made from a primary sheet or blank 38 and a secondary sheet or blank 36. The primary sheets used to form the packing elements 28, 30, 32 and 34 are identical in each case, as are the secondary sheets, although the primary packing element sheet 38 for the packing units 30 and 34 is oppositely folded from the packing element sheet 38 used to make the packing elements 28 and 32. Thus, the packing elements 30 and 34 are of reverse or mirror image construction to the packing elements 28 and 32.

The particular shape of the packing elements in their assembled condition is illustrated in FIG. 3 with reference to the packing element 34. The two blanks 36 and 38, when folded and assembled, provide a packing element having two main windshield supporting and engaging parts: a block or log 40 of triangular cross section and a panel 42. The block 40 serves primarily to support the weight of the sheet of glass in the direction of the plane of the glass and also helps to limit fore and aft transverse movement of the glass. The panel 42 cooperates with the block 40 in performing this latter function and also serves to locate the glass and hold it against undesired endwise movement toward and away from the end walls 22 and 24 of the carton.

The primary blank 38 is of generally elongated shape and is divided into consecutively arranged sections which are separated from one another by score lines. The several sections of the blank 38 which are adapted to form the block 40 extend from one side of the panel 42 and are each of elongated rectangular shape. Disposed at the end of the blank opposite from the panel 42 is a first outer block wall section 44. Next succeeding, in order toward the blank 42, are a first block base section 46, a first block inner wall section 48, a second outer block wall section 50, a second block base section 52 and a second inner block side wall section 54. Said sections are separated from one another and from the panel 42 by score lines 56, 58, 60, 62, 64 and 66, respectively. Located on opposite sides of the panel 42 are panel supporting walls 68 and 70 separated from the panel 42 by score lines 72 and 74, respectively. The walls 68 and 70 have triangular flaps 76 and 78, respectively, formed on the sides thereof adjacent the block side wall section 54. The flaps are pivotal with respect to the side walls 68 and 70 about score lines 80 and 82.

As may be seen in FIG. 4, the blank 38 is also provided with several slots and openings. It will be seen that section 44 has a recess 85 cut in from the edge thereof with a flap 86 disposed adjacent the bottom of the recess. An opening 88 is formed in the sections 48 and 50 and is shaped to provide a flap 90 and an end edge 92 at the end thereof opposite the flat 90. The opening 88 is relatively wide throughout the portion thereof disposed in section 48 and also at the end thereof adjacent the edge 92. However, the major portion of the slot 88 disposed within the section 50 is relatively narrow, as indicated at 94. In addition, holes 96 are formed on opposite sides of the narrow portions 94. The formation of the narrow portion 94 of the slot leaves edges or shoulders 98 opposite from and spaced a short distance from the end edge 92.

An elongated slot 100 is formed in the panel 42 and extends into the block section 54. For the major portion of the length of the slot 100 it is relatively narrow, being about the width of the narrow portion 94 of the slot 88, which is slightly greater than the thickness of the windshield to be packaged. At the end edge 102 of the slot 100 in the section 54, the slot widens to a width slightly greater than the flap 90. An enlargement 104 is also provided at the other end of the slot 100 to accommodate windshields of slightly varying curvature. In addition, a plurality of circular openings 106 are formed along opposite sides of the slot 100 to afford a measure of resiliency to the portions of the panel lying along the opposite edges of the slot 100. Similarly, the holes 96 increase the resiliency of the slot portion.

The block 40 is formed by folding the blank 38 along the score lines 56, 58, 60, 62, 64 and 66 to a shape of triangular cross section, as indicated in FIG. 3. This is accomplished by first positioning the free edge 84 of the section 44 adjacent the score line 60 and then folding section 50 flat against section 44. In so doing, the flap 86 is extended through the portion of the slot 88 lying between the shoulders 98 and the end edge 92. Flap 86 will be held in this position by engagement with the shoulders 98. Next, the section 52 is folded flatly against the section 46 and the section 54 is folded against the section 48 while also inserting the flap 90 through the wide portion of the slot 100 adjacent its end edge 102. Next, the blank 36 is inserted in position within the block portion 40. As may be seen in FIG. 4, the blank 36 includes a central web section 108 with wall sections 110 and 112 on opposite sides thereof. The wall sections 110 and 112 are bent downwardly relative to the central section 108, so that the blank 36 may be inserted within the block 40 with the wall 112 lying flatly against the wall 48, and the central section disposed in alignment with the flaps 86 and 90. Next, the panel supporting walls 68 and 70 are bent downwardly to a position perpendicular to the panel 42. Then, the flaps 76 and 78 are bent inwardly along the score lines 80 and 82 and are wedged between the wall 110 of blank 36 and the wall section 44. This is most conveniently accomplished by projecting the blank 36 outwardly from the block at one end thereof, wedging the flap at this end into place and thereafter projecting the opposite end of the blank 36 out from the block 40 and wedging the other blank into place. Thus, the flaps 76 and 78 are held in place within the block 40 and are prevented from coming out of the block by their engagement with the adjacent of the carton front or rear walls 18 or 20. The panel supporting walls 68 and 70 are thereby held in a proper vertical position perpendicular to the panel 42 with the lower edges of the walls 68 and 70 co-planar with the outer surface of the bottom block base section 52.

When the windshield 26 is assembled relative to the packing elements, it will be seen that the edge of the glass rests upon the flaps 86 and 90, as well as the central section 108. However, the weight of the glass is taken up by all of the walls 50, 44, 110, 112, 48 and 52 and in a direction parallel to the plane of said walls. Furthermore, no raw edges of corrugated paperboard are left open to the edge of the glass and, thus, the glass is not free to bite into or become embedded in sheets of cardboard by being supported directly on a free edge thereof. Furthermore, it will be seen that the weight of the glass resting on the flaps 86 and 90, as well as on the central section 108, acts to press the base portion of the block 40 firmly against the adjacent wall of the carton, thereby holding the panel 42 securely in its intended plane and preventing tipping or inclination of the packing element about any given edge thereof which may be resting on an adjacent carton wall. It has been found that the packing element of the present invention for this reason possesses unusual stability and ability to be retained in position.

FIGS. 5, 6, 7 and 8 illustrate another form of the invention in which a packing element 114 is provided with supplementary supporting flaps and wall sections by means of which the unit may be made to accommodate cartons or windshields of varying sizes. The packing element 114 includes a central block portion 116 of triangular cross section integrally joined to a panel 118 having a windshield-receiving slot 120. The panel 118 has supporting side walls 122 and 124 depending from opposite sides thereof which are in turn provided with depending walls 126 and 128, respectively. The wall 126 has consecutively joined wall portions 130 and 132 extending therefrom which are provided with projections or shoulder portions 134 and 136. The wall 128 has consecutively joined wall sections 138 and 140 extending from the side thereof which are provided with projections or shoulder portions 142 and 144. When the packing element is used with a given smaller size windshield or a given larger size box, the walls 126 and 128 are left co-planar with the supporting walls 122 and 124, while the walls 130, 132, 138 and 140 are bent to a sinuous or W shape formation, as illustrated in FIG. 6, engaging the bottom wall 146 of the block section 116. The position of the wall sections 130, 132, 140 and 138 is maintained by projections 134 and 142 engaging the block on one side thereof and the tabs 136 and 144 engaging the block on the other side thereof. In addition, flaps 148 and 150 formed on the ends of the panel supporting side walls 122 and 124 are left co-planar with their respective side walls 122 and 124 and the adjacent end wall of the box. When the size of the windshield or shipping carton does not require the use of the supplementary walls and flaps, the wall 128 and its connected walls 138 and 140 are folded to a position lying flatly against the adjacent wall of the carton and flatly against the bottom wall 146 of the block portion 116. Similarly, on the other side of the unit, the wall 126 and its connected walls 130 and 132 are all folded flatly against the adjacent wall of the carton and against the bottom wall 146 of the block portion 116. In turn, the flaps 148 and 150 are folded perpendicularly to the supporting walls 122 and 124 and lie flatly against the adjacent end wall of the carton.

Figure 11:
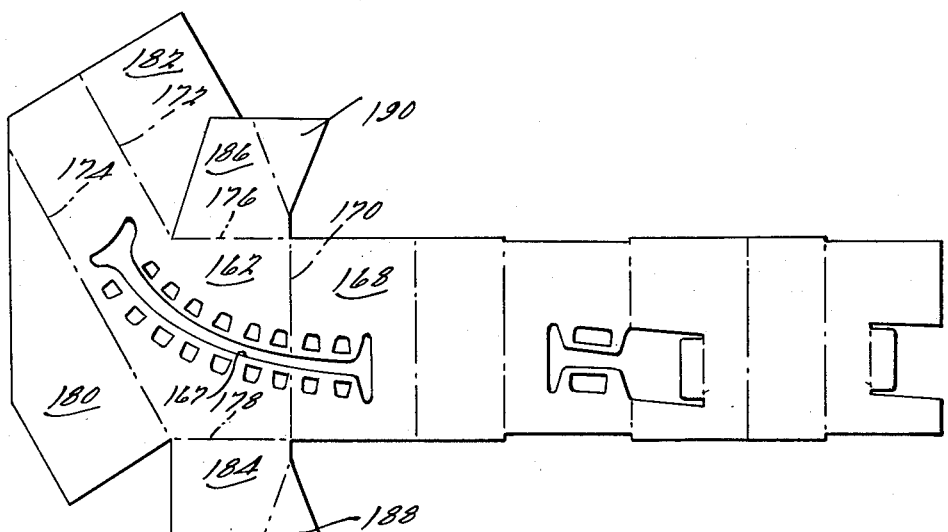
FIG. 11 is a plan view on a reduced scale of the sheet of material from which the principal element of the packing element of FIG. 10 is formed.

FIGS. 9, 10 and 11 illustrate an alternative form of packing element 151 which is adapted for use in a contour-shaped box 152, such as is illustrated in my co-pending patent application, Serial No. 57,193, filed September 20, 1960. This box or carton includes a central thick portion 154, together with a pair of end wing portions 156 and 158 extending angularly from opposite sides of the central portion 154. Just as in the prior forms of the invention, this box is intended to utilize four packing elements disposed at the four corners of the box. Each packing element includes a panel 160, which is comprised of a first portion 162 disposed within the central portion 162 disposed within the central portion 154 of the box, and a second portion 164 disposed within one of the wing portions of the box. The panel 160 is integrally connected to a block portion 166 which is formed similarly to the block portions of the previous embodiments of the invention. A slot 167 is formed in the panel 160 and extends into a block section 168 separated from the panel 160 by a score line 170. The outer limits of the panel section 164 are defined by parallel score lines 172 and 174 and the outer limits of the panel section 162 are defined by score lines 176 and 178. Supporting walls are provided for the panel 160 and include a wall 180 extending along score line 174 and a wall 182 extending along score line 172. Additional supporting walls include a wall 184 extending along score line 178 and a wall 186 extending along score line 176. The walls 180 and 182 are held in place within the wing sections of the box by mere engagement with the adjacent walls of the box. The walls 184 and 186 are provided with triangular-shaped flaps 188 and 190, respectively, which fit within the block portion 166 and are wedged between a side wall of the block portion 166 and a secondary supporting member 192 fitted within the block portion 166.

In prior packages for heavy windshields or the like, difficulty has been encountered as a result of the edge of the windshield digging or biting into the supporting wall on which it rested. This has resulted in the wall holding the edge of the windshield, when the carton has been dropped or subjected to impact, preventing "floating" of the windshield and causing cracking of the glass along the held edge. It will be seen that the packing elements of the present invention provide a large number of supporting walls to support the edge of the windshield and, furthermore, the edge itself only contacts the material of the packing elements along the flat planar sheets thereof. Further, in one commercially utilized packing element for windshields, the packing elements at each of two corners are integrally connected. This not only presents some assembly and handling problems, but also makes the units more difficult to manufacture on normal production machinery as a result of the extreme length of sheet material required. Each of the four packing elements used to support a sheet to be packaged in applicant's construction is a separate unit. Nevertheless, each unit is stable and will not tip out of position. This is the result of the wide base of the triangular block and the fact that the weight of the windshield is supported in a plane extending between the opposite edge of the base of the block.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A packing unit for supporting a windshield or the like in a shipping container having enclosing side walls, said packing unit having a hollow block portion provided with a base adapted to lie flatly against a wall of said container, block walls extending from spaced locations on said base, a panel connected to said block walls in a location spaced from said base, supporting walls extending normally from said panel, means holding said panel supporting walls in fixed relation to said block portion, and a secondary supporting member disposed in said block, said panel and said block portion having a slot adapted to receive said windshield for supporting engagement by said secondary supporting member.

2. A packing unit for supporting a windshield or the like in a shipping container having enclosing side walls, said packing unit being formed from sheet material and having a block portion provided with a base adapted to lie flatly against a wall of said container, a pair of converging block walls extending from opposite sides of said base, a panel integrally connected to said block portion along the line of convergence of said block walls, supporting side walls for said panel connected to said base, and means defining a windshield receiving opening in said panel and said block portion.

3. A packing unit for supporting a sheet of frangible material in a shipping container having enclosing side walls, said packing unit being formed from sheet material having a folded block portion adapted to support the weight of said sheet of frangible material at a edge thereof, spaced supporting walls on said block portion, a panel connected to said supporting walls, said panel and said supporting walls having a slot adapted to receive said sheet of frangible material and said block having flap means overlying the edges of said slot in said supporting wall adapted to bear the weight of said sheet of frangible material.

4. A packing unit for supporting a sheet of frangible material in a shipping container having enclosing side walls, said packing unit being formed from sheet material having a folded block portion adapted to support the weight of said sheet of frangible material at an edge thereof, said block portion having a base and inner and outer side walls extending from said base on each of two opposite sides thereof, a panel connected to said block portion, said panel and said block side walls having a slot adapted to receive said sheet of frangible material, flaps on said inner side supporting walls adjacent one end of said slot, said flaps being folded over the adjacent slot edges of said outer side supporting walls in a position adapted to be engaged by the edge of said sheet of frangible material.

5. A packing unit for supporting a sheet of frangible material in a shipping container having enclosing walls, said packing unit beng formed from sheet material having a folded block portion provided with a base adapted to lie flatly against a wall of said container, block walls extending from spaced locations on said base, a panel connected to said block walls, supporting walls on said panel, flaps on said panel supporting walls, means holding said flaps in engagement with said block supporting walls, and means defining an opening in said panel and said block for receiving said sheet of frangible material.

6. A packing unit for supporting a sheet of frangible material in a shipping container having enclosing walls, said packing unit being formed from sheet material and having a folded hollow block portion adapted to engage a wall of said container, a panel connected to said block portion, supporting walls on said panel, flaps on said panel supporting walls, a secondary supporting member disposed in said block, said flaps being held between said secondary supporting member and an adjacent wall of said block, and means defining an opening in said panel and said block for supportingly receiving said sheet of frangible material.

7. A package including a container having top, bottom, front, rear and end walls, a sheet of glass disposed in said container, two pairs of packing elements for engaging and supporting said sheet of glass on each of two opposite edges thereof, each of said packing elements having a hollow block portion provided with a base, the bases of one pair of packing elements engaging said top wall and the bases of the other pair of said packing elements engaging said bottom wall, said packing elements each having a slotted panel portion connected to said base portion, supporting walls extending from opposite sides of said panel portion, and a flap on each of said supporting walls inserted into said block portion, said container front and rear walls engaging said supporting walls and preventing withdrawal of said flaps from said block.

References Cited in the file of this patent
UNITED STATES PATENTS
2,747,732    Fischer _____ May 29, 1956